United States Patent

[11] 3,581,733

[72] Inventor  Theo Grandjean
              Lausanne, Switzerland
[21] Appl. No. 783,040
[22] Filed     Dec. 11, 1968
[45] Patented  June 1, 1971
[73] Assignee  U.S. Philips Corporation
              New York, N.Y.
[32] Priority  Dec. 30, 1967
[33]           Germany
[31]           P 15 66 115.1

[54] HEART CATHETERIZATION DEVICE
     4 Claims, 1 Drawing Fig.
[52] U.S. Cl. .................................................. 128/2.05
[51] Int. Cl. .................................................. A61b 5/02,
                                                              A61m 5/14
[50] Field of Search .......................................... 73/402;
              128/2.05 C, 2.05 D, 2.05 PR, 2.05 MISC., 214,
                                                              214.2

[56]                    References Cited
                    UNITED STATES PATENTS
2,600,324   6/1952   Rappaport ....................  128/2.05DX Primary Examiner—Channing L. Pace
Attorney—Frank R. Trifari ABSTRACT: A device for measuring such things as human blood pressure within the blood vessels and heart, which uses a catheter and adapts same for placement over extended periods during its operation. A salt solution, conveyed by valve controlled conduits, is made to constantly flow through the catheter to prevent blood coagulation and also serves to transmit the propagated blood pressure waves to a transducer for measurement.

PATENTED JUN 1 1971
3,581,733
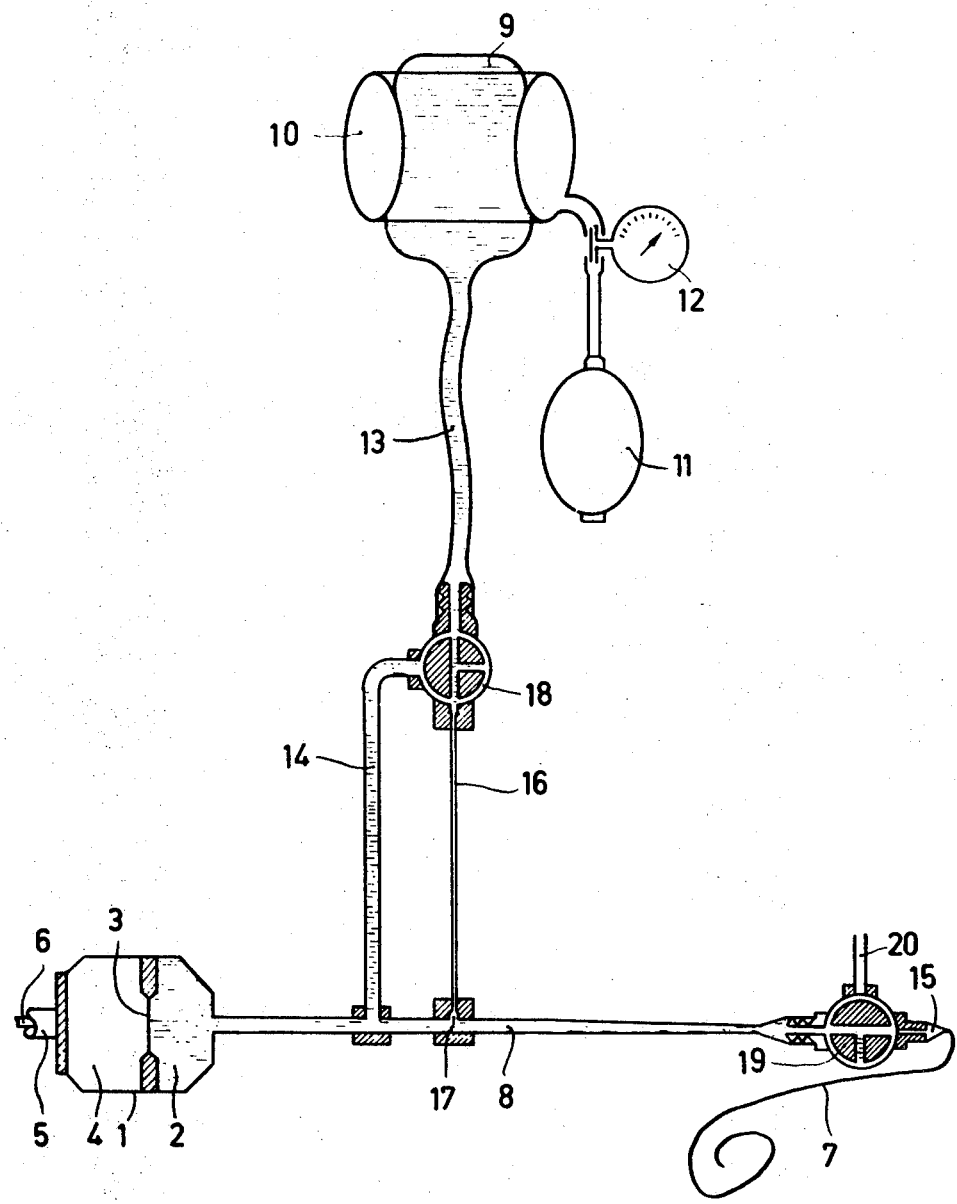
INVENTOR.
THEO GRANDJEAN
BY
Frank R. Trifari
AGENT

HEART CATHETERIZATION DEVICE

The invention relates to a heart catheterization device suitable for uninterrupted long term use for the observation and recording of physiological phenomena, for example, the blood pressure in various regions of the heart, lung circulation and for taking blood for oxygen saturation measurement or for hematological investigation.

It is sometimes required that such devices remain operative without interruption for hours at a stretch and often for one or more days. They comprise a thin, flexible hose of such small thickness that it can be inserted into a blood vessel, for example, in the patient's arm and can be pushed on until its end reaches the place of measurement. In order to ensure an open communication between the measuring place and the device for an adequate period of time, the dimensions of the tube have been reduced to the minimum permissible for carrying out the examinations involved. The opening at the end of the tube at the measuring place becomes obturated too soon by coagulation of the blood when using very thin tubes, so that the device cannot continue the operation for a sufficiently long time. Very thin catheter tubes can, however, be inserted with considerably less discomfort for the patient than large sized tubes, which will not clog as soon and which permit counteracting coagulation of the blood by the intermittent supply of a physiological salt solution, so that the use of thin tubes is desirable.

An object of the invention is to allow the use of very thin catheter tubes while avoiding the disadvantage of premature clogging.

According to the invention the device comprises a capillary connection between a pressurized liquid container and a channel for connecting the catheter tube with the device.

A device embodying the invention will now be described with reference to the accompanying drawing which is an elevational view diagrammatically showing the elements of the device.

In order to carry out measurements of blood pressure the device comprises a transducer 1 for converting pressure variations into proportional electrical voltage variations. The simplified form shown of the transducer comprises a pressure chamber 2, separated by a membrance 3 from the electrical pickup 4. The connection 5 serves for electric conductors 6 to be connected to a known recording apparatus, for example, an oscilloscope or stylus.

The communication between the pressure chamber 2 and the catheter tube 7 is established by a channel 8. When the device is used for blood pressure measurement, the pressure chamber 2, the channel 8 and the catheter tube 7 are filled with a physiological salt solution. A supply thereof is contained in the liquid container 9 having a flexible wall. It is surrounded by an inflatable bush 10, which communicates with a rubber bellows 11, by which air can be supplied through a valve to the bush 10, the pressure of which is indicated by a manometer 12.

For guiding the liquid a flexible tube 13 and a tube 14 are used, the latter being connected to the communication channel 8 between the pressure chamber 2, of the transducer 1, and the connection 15 with the catheter tube 7.

A capillary tube 16 extends from the point where flexible tube 13 connects with the tube 14 to a connecting piece 17 in the communication channel 8 and forms a parallel communication with the tube 14 for the supply of liquid from the container 9 to the communication channel 8. The tube 14 has an inner diameter of about 2 mm., whereas the inner diameter of the capillary tube 16 is about 0.12 mm., so that as compared with the passage of the tube 14 the quantity of liquid passing through the capillary tube 16 is negligible.

In order to obtain a useful effect of the capillary connection, the communication between the flexible tube 13 and the tube 14 includes a three-way cock 18. In one of the possible positions of the cock plug the liquid container 9 communicates directly with the tube 14 and in a further position of the cock plug this communication is interrupted and the liquid container 9 and the capillary tube 16 directly communicate with each other.

The device further comprises a three-way cock 19. The communication channel 8 can thereby be closed off from the connection 15 of the catheter tube 7. The cock can also be moved into a position in which a suction duct 20 communicates with the catheter tube 7 for withdrawing a quantity of blood from the patient for further examination.

The catheter tube 7 usually has a length of about 110 cm. and an outer diameter of about 0.8 mm., whilst the diameter of the channel is about 0.55 mm. Suitable material for such a tube is polyethylene, which, as is known, does not irritate the body tissue by its contact.

When starting the device, the liquid container 9 and all channels should be filled with the salt solution, and all air be completely expelled. To accomplish this, the plug of the three-way cock 19 is moved into the position in which the communication channel 8 communicates with the suction duct 20. When the salt solution enters duct 20, the filling is complete. The plug of the three-way cock 18 is turned into the position in which the liquid container 9 communicates with the tube 14 and the capillary tube 16.

After the catheter tube 7 is inserted into the blood path and connected at 15 with the connecting duct 8, the plug of the cock 19 is turned into the position in which the salt solution flows through the catheter tube for filling purposes. This is accomplished by raising the pressure on the liquid in the container 9 through a supply of air from the pressure bush 10 by means of the bellows 11, the pressure being raised to about 300 mm. Hg. After the plug of the three-way cock 18 is moved into the position shown, so that the tube 14 is closed, the device is ready for measuring the blood pressure. The blood pressure waves at the inserted end of the catheter tube 7 propagate through the pressure chamber 2 of the transducer 1 and are measured.

In order to prevent blood from flowing back into the catheter tube 7, the communication between the capillary tube 16 and the liquid container 9 is constantly maintained so that a small quantity of salt solution constantly flows through the communication tube 8 and the catheter tube 7. The quantity of liquid is not more than 1 to 2 ml. an hour with a capillary length of 300 mm. and a pressure of 300 mm. Hg in the liquid container 9, which quantity can be absorbed and excreted by the patient's body without any difficulty. The flow is sufficient to avoid blood coagulation at the end of the catheter tube and the resistance against propagation of pressure in the capillary tube is sufficient to prevent the communication between the communication channel 8 and the liquid container 9 from affecting the measuring results. The time of operation of the device is therefore no longer adversely affected by blood coagulation.

I claim:

1. A device for use in measuring blood characteristics such as blood pressure comprising a catheter tube for insertion into the bloodstream of a body, one end of which is to be placed at the point of measurement within the body, a connection member attached to the other end of said catheter tube, a transducer apparatus having a pressure chamber for picking up and converting pressure variations into proportional electrical voltage variations susceptible of measurement, a channel communicating between said pressure chamber and said connection member, a container for supplying a salt solution to said catheter, a tube communicating between said pressure chamber and said container, a capillary tube connected between said container and said channel for communicating said solution to said catheter and means for applying a pressure of approximately 300 mm. of mercury to the solution in the container, the dimensions of the capillary tube being such that a steady flow of solution is directed through said catheter tube at the rate of approximately 1 to 2 mls. per hour thereby preventing coagulation of blood in the tube so as to permit use thereof over prolonged periods of time.

2. The device according to claim 1 further comprising means for connecting said container with said capillary tube so as to communicate said solution to said catheter tube, and for connecting said container with the tube communicating between said pressure chamber and said container so as to fill said chamber and channel with said solution.

3. The device according to claim 1 further comprising means for closing the communication tube between said pressure chamber and said container.

4. The device according to claim 3 wherein said means for closing the communication tube includes a distributing cock for connecting the container with the pressure chamber through said communication tube and/or with said capillary tube.